United States Patent [19]
Mitsui

[11] Patent Number: 5,199,267
[45] Date of Patent: Apr. 6, 1993

[54] GAS CIRCULATION TYPE GAS LASER APPARATUS AND METHOD OF OPERATING THE SAME

[75] Inventor: Jin Mitsui, Chigasaki, Japan

[73] Assignee: Sumitomo Heavy Industries, Ltd., Tokyo, Japan

[21] Appl. No.: 822,609

[22] Filed: Jan. 15, 1992

[30] Foreign Application Priority Data

Jun. 4, 1991 [JP] Japan .................................. 3-132913

[51] Int. Cl.⁵ .............................................. F25B 19/00
[52] U.S. Cl. .......................................... 62/51.1; 55/71; 372/57; 372/59
[58] Field of Search ............... 62/51.1; 55/71; 372/57, 372/59

[56] References Cited

U.S. PATENT DOCUMENTS 4,317,087 2/1982 Sander et al. ........................ 372/57
4,601,040 7/1986 Andrews et al. ..................... 372/57
4,977,749 12/1990 Sercel ................................. 62/51.1

FOREIGN PATENT DOCUMENTS 0199934 11/1986 European Pat. Off.

OTHER PUBLICATIONS

Patent Abstracts of Japan, vol. 10, No. 104 (E397)(2161) Apr. 19, 1986 of JP-A-60-242684, Dec. 1985.
Review of Scientific Instruments, vol. 52, No. 11, Nov. 1981, New York, pp. 1655-1656; K. O. Kutschke et al, "Rare Gas Recovery Systems for Rare Gas Halide Lasers".
Applied Physics Letters, vol. 32, No. 5, Mar. 1978, pp. 291-292; P. M. Johnson, "A Closed-Cycle Gas Recirculating System for Rare-Gas Halide Excimer Lasers".

*Primary Examiner*—Ronald C. Capossela
*Attorney, Agent, or Firm*—Frishauf, Holtz, Goodman & Woodward

[57] ABSTRACT

The invention relates to a gas laser using a laser gas medium while circulating and purifying the laser gas medium. An object of the invention is to provide a gas laser apparatus operating method and a gas laser apparatus in which it is easy to keep laser output power constant for a long time. Disclosed is a method for performing laser oscillation while circulating a laser gas medium containing a rare gas, in which a gas which is to be solidified at a trap temperature is preliminarily attached to a low temperature trap containing a filler so as to be solidified, and then the solidified gas is brought into contact with the laser gas medium.

13 Claims, 5 Drawing Sheets

PRIOR ART
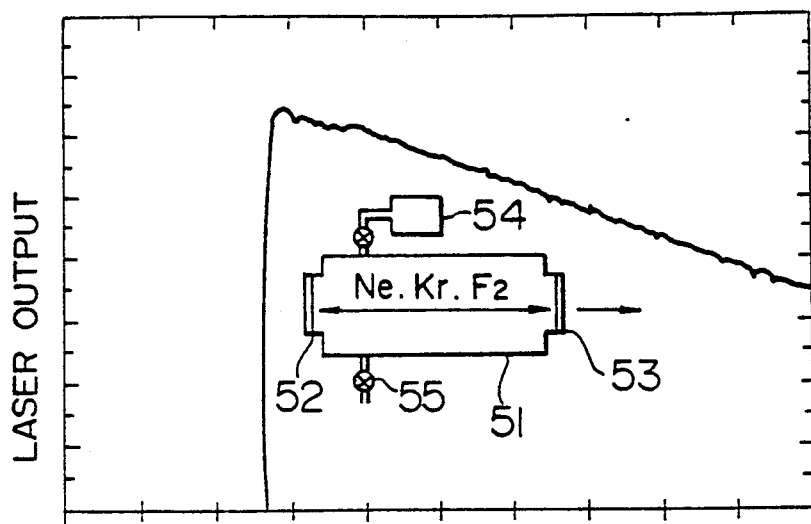
FIG. 2A
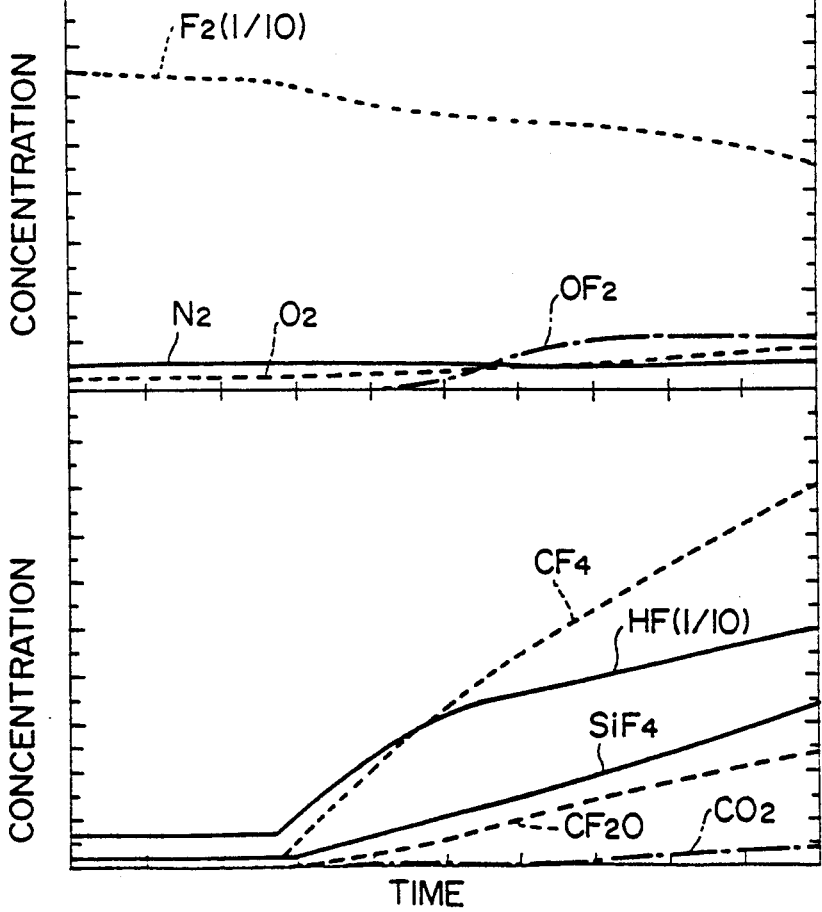
FIG. 2B
FIG. 2C

GAS CIRCULATION TYPE GAS LASER APPARATUS AND METHOD OF OPERATING THE SAME

BACKGROUND OF THE INVENTION

1. Field of the Invention

The present invention relates to a gas laser and particularly relates to a gas laser using a laser gas medium while circulating and purifying the laser gas medium.

In this specification, the concept "solidification" means a state in which gas molecules lose kinetic energy thereof on a surface to become solid on the surface. The concept "adsorption" means a state in which gas molecules attached to a surface have kinetic energy corresponding to the temperature of the surface so that the gas molecules are being attached under the balance between a desorbing force and an attaching force. Accordingly, solidified gas molecules are not replaced by others but adsorbed gas molecules are replaced by gas molecules having a stronger adsorbing force.

2. Description of the Related Art

Although a description will be set forth, by way of example, of the case where the present invention is applied to a KrF excimer laser, the invention is not limited to such KrF excimer laser. For example, the invention may be applied to a ArF excimer laser and the like.

A KrF excimer laser is operated in a manner so that a mixture of gas of about 95–99% of Ne, about 1–5% of Kr and about 0.1–0.5% of $F_2$ is contained as a laser gas medium in a laser tube, which is made of metal, glass, plastics, ceramics or the like, and has mirrors disposed at the opposite ends of the laser tube, and light emission is caused in the laser gas medium through electric discharge to thereby cause resonance.

In general, a fluorine gas is strong in reactivity and, in particular, fluorine gas excited by electric discharge or other excitation means is so strong in reactivity that a reaction between the fluorine gas and constituent materials of the laser vessel is caused by the electric discharge. This can generate a level of impurities in the laser gas which causes the laser output from the KrF excimer laser to decrease as the number of discharge pulses increases due to the presence of these impurities.

SUMMARY OF THE INVENTION

An object of the present invention is to provide a gas laser apparatus operating method in which it is easy to keep the laser output power constant for a long time.

Another object of the present invention is to provide a gas laser apparatus in which it is easy to keep the laser output power constant for a long time.

According to the present invention, there is provided in a method for performing laser oscillation while circulating a laser gas medium containing a rare gas, during a method for operating a gas laser apparatus comprising the steps of: preliminarily attaching a solidifiable gas which is solidified at the trap temperature in a low temperature trap containing a filler so as to solidify the solidifiable gas; and then bringing the solidified solidifiable gas into contact with the laser gas medium.

According to the present invention, there is also provided a gas laser apparatus comprising: a laser tube containing a laser gas medium and for emitting laser light; a low temperature trap containing a filler being connected to the laser tube so as to form a circulation path; a refrigerant vessel for refrigerating the low temperature trap to a predetermined temperature; and means for supplying to the low temperature trap, a solidifiable gas which solidifies at the predetermined temperature.

According to the present invention, the surface of the refrigerated wall can be caused to serve as an adsorption surface by preliminarily solidifying a gas which is solidified at a refrigeration temperature in a low temperature trap filled with a filler. By this way, not only impurity gas components exhibiting low vapor pressures at the predetermined low temperature but impurity gas components exhibiting high vapor pressures can be removed from the laser gas medium.

BRIEF DESCRIPTION OF THE DRAWINGS

FIGS. 1A and 1B show an embodiment of the present invention, in which FIG. 1A and 1B are schematic sectional views of a laser gas medium purifying system for explaining a laser gas medium purifying method according to an embodiment of the present invention.

FIGS. 2A, 2B and 2C are graphs for explaining a conventional technique.

FIGS. 5A and 5B are graphs showing experimental results which form the foundation of the present invention, in which FIG. 5A is a graph showing a result in which Xe mixed in He is trapped on the liquid nitrogen trap, and FIG. 5B is a graph showing a result in which air components mixed in He are adsorbed on the liquid nitrogen refrigerated adsorption tower.

DESCRIPTION OF THE PREFERRED EMBODIMENTS

Figure 1A:
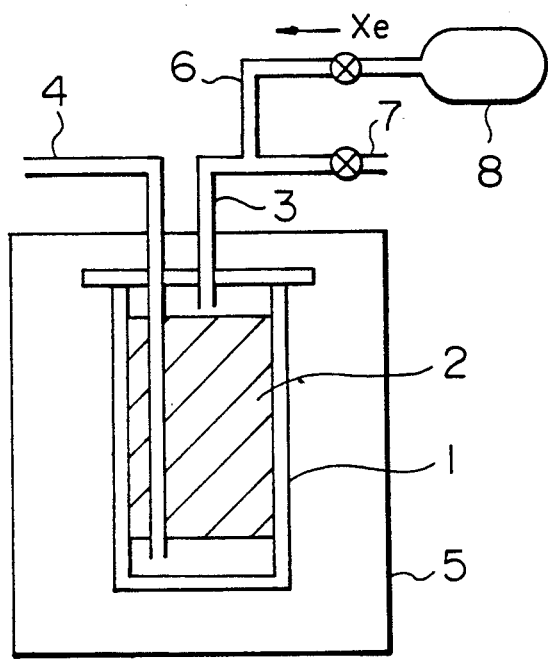

Prior to describing the embodiments of this invention, a typical conventional gas laser and the analysis thereof will be described.

The characteristics of a typical conventional KrF excimer laser are shown in FIG. 2A, FIG. 2B and FIG. 2C. As shown in FIG. 2A, a laser tube 51 has, at its one and the other ends respectively, a mirror 52 and a half mirror 53 having a desired reflectivity and a desired transmittance. Raw material gases are supplied from a gas source 54. The changes of the characteristics of the laser with the passage of time in the case where laser oscillation is continued under the condition that the inside of the laser tube 51 is first exhausted through an exhaust valve 55 and then fresh raw material gases are supplied from the gas source 54 to a predetermined pressure while the valve 55 being closed will be described hereinbelow. FIG. 2A shows laser output power, and FIG. 2B and FIG. 2C show gas component concentrations in the laser tube 51. In each graph, the abscissa represents the time.

As shown in FIG. 2A, laser output power is about zero before oscillation is caused. When oscillation is started, the laser output power reaches a large value rapidly. The laser output power, however, gradually decreases with the passage of oscillation time due to depletion of fluorine and increase of impurity concentrations.

As shown in FIG. 2B and FIG. 2C, before the laser oscillation is started, the gas components in the laser tube 51 are kept almost constant and impurities such as $N_2$, $O_2$, HF and $SiF_4$ exist slightly. Though not shown, the concentrations of Ne and Kr, which are main components of the laser gas medium, are kept almost constant. When laser oscillation is started, the concentrations of impurities such as $CF_4$, HF, $SiF_4$, etc. gradually increase as shown in FIG. 2C. On the contrary, the concentration of $F_2$ as a constituent component of the laser gas medium gradually decreases. It is considered that the lowering of the laser output power is caused by both the increase of these impurities and the decrease of $F_2$ which is a necessary constituent component of the laser gas medium.

In order to attain a constant quantity of laser output power, it will be necessary to keep the inner pressure of the laser tube 51 constant by supplying fresh gases continuously from the gas source 54 while exhausting old gases through the exhaust valve 55, in the structure shown in FIG. 2A. According to this method, however, not only the expensive rare gas Kr is consumed wastefully but control of raw material gas supply and exhaust of gas medium becomes complex.

Therefore, a method in which gases in the laser tube are circulated through a liquid nitrogen trap to thereby remove generated halogenides and other impurities has been proposed.

Figure 3:
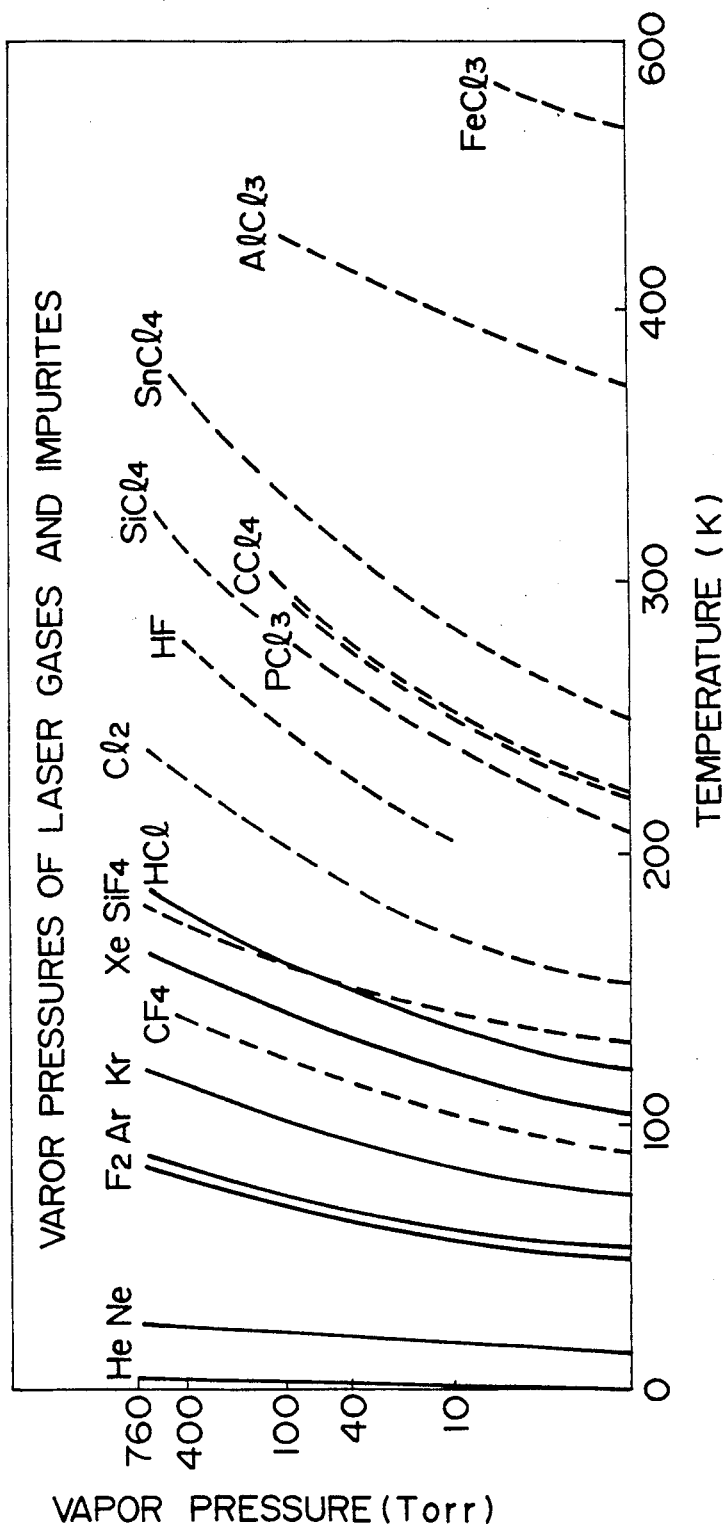
FIG. 3 is a graph showing vapor pressure curves of laser gases and impurities.

Vapor pressure curves of the species of the laser gas medium and impurities are shown in FIG. 3. The laser gas medium in the KrF excimer laser contains Ne, Kr and $F_2$ as necessary components and contains $CF_4$, $SiF_4$, HF, etc. as main impurity gases.

Figure 4:
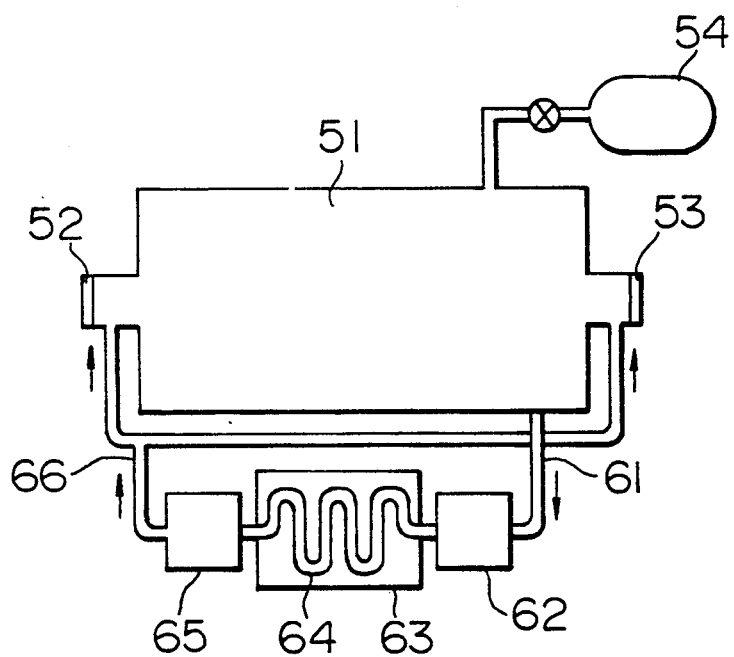
FIG. 4 is a schematic sectional view showing a KrF excimer laser apparatus having a conventional liquid nitrogen refrigerated trap.

For example, the vapor pressures of HF and $SiF_4$ as impurity gases exhibit very low values at the temperature of liquid nitrogen. Accordingly, these impurity gases can be trapped by the use of a liquid nitrogen trap. FIG. 4 schematically shows a KrF excimer laser apparatus having a liquid nitrogen refrigerated trap.

In FIG. 4, a laser gas medium from the gas source 54 is supplied to the laser tube 51 having the reflection mirror 52 and the half mirror 53. The laser tube 51 is provided further with a gas outlet path 61 and a gas feedback path 66. A dust filter 62, a liquid nitrogen refrigerated trap 64 and a pump 65 are connected between the gas outlet path 61 and the gas feedback path 66. The liquid nitrogen refrigerated trap 64 is immersed in a liquid nitrogen tank 63 and refrigerated to the temperature of liquid nitrogen.

The laser gas medium within the laser tube 51 is fed into the liquid nitrogen refrigerated trap 64 from the gas outlet path 61 through the dust filter 62, and is fed back into the laser tube 51 from the pump 65 through the gas feedback path 66 after those components which exhibit low vapor pressures at the temperature of liquid nitrogen are trapped on the wall surface of the liquid nitrogen refrigerated trap 64. The impurity gases $CF_4$, $SiF_4$ and HF respectively exhibit very low vapor pressures at the temperature of liquid nitrogen, so that impurity gas molecules colliding with the wall surface of the liquid nitrogen refrigerated trap 64 are trapped thereon.

In the structure shown in FIG. 4, increasing the tube diameter of the liquid nitrogen refrigerated trap is required to attain an adequate flow rate. When the tube size is increased, however, gas components passing through the trap without touching the tube wall becomes possible.

As shown in FIG. 3, Kr as a constituent member of the laser gas medium exhibits a low vapor pressure at the temperature of liquid nitrogen, so that the probability that Kr is trapped to the liquid nitrogen refrigerated trap is high. The Kr content in the laser gas medium decreases when Kr is trapped to the liquid nitrogen refrigerated trap. Thus, it becomes necessary to add Kr in order to keep the laser output power constant for a long time. In the operating condition of the KrF excimer laser, the gas flow rate is generally about 5 Nl/min and the gauge gas pressure is generally in the range 2 to 5 $Kg/cm^2G$ (total pressure: 3-6 $Kg/cm^2$).

Further, a method for performing both separation of halogens and trapping of the total amount of the halogens by using a getter trap using calcium, titanium, etc. has been proposed. Because the total amount of $F_2$ is trapped in this case, it is necessary to supply $F_2$ and, accordingly, it is necessary to control the quantity of addition thereof strictly.

As described above, in the conventional KrF excimer laser, it is difficult to keep the laser output power constant for a long time.

Figure 5A:
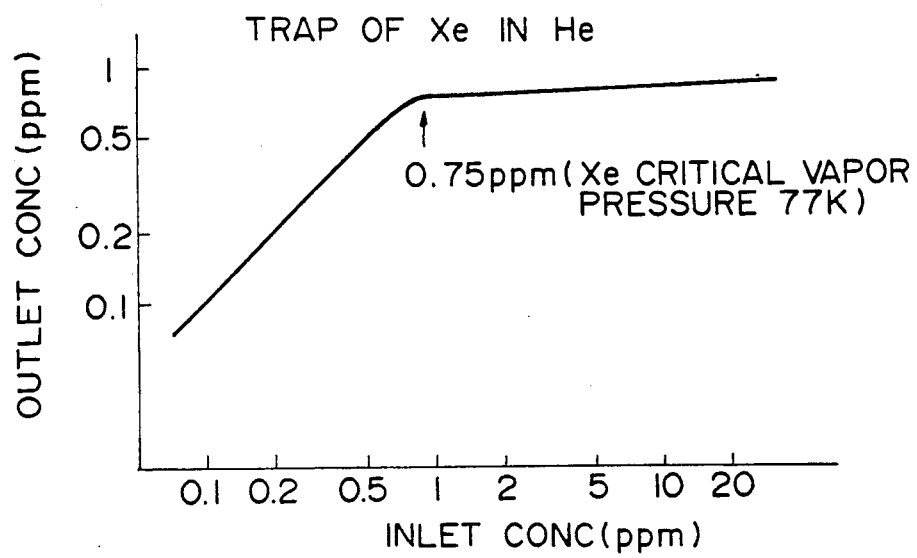
Figure 5B:
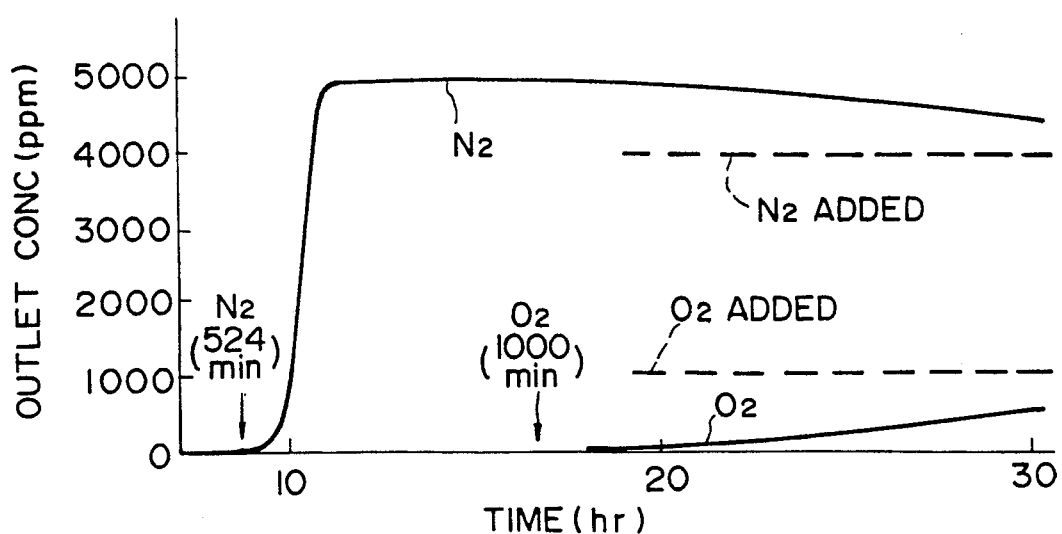

Experimental results which form the foundation of the present invention are shown in FIGS. 5A and 5B. FIG. 5A shows an result of an experiment in which Xe mixed in He is trapped. After the outlet and inlet of the liquid nitrogen refrigerated trap were filled with glass wool, the liquid nitrogen refrigerated trap was refrigerated by liquid nitrogen. The concentrated of Xe was measured after He mixed with a predetermined concentration of Xe is allowed to pass through the liquid nitrogen trap. The abscissa represents the concentration of Xe at the inlet of the trap in ppm. The ordinate represents the concentration of Xe at the outlet of the trap in ppm.

The concentration of Xe at the outlet of the trap is plotted when the concentration of Xe in He gas, which is supplied to the liquid nitrogen refrigerated trap, is changed variously. While the concentration of Xe at the inlet of the trap is low, the concentration of Xe at the outlet of the trap exhibits a value almost equal to the concentration of Xe at the inlet of the trap. This shows the fact that Xe is little trapped to the liquid nitrogen refrigerated trap. When the concentration of Xe at the inlet of the trap approaches 1 ppm, on the other hand, the concentration of Xe at the outlet of the trap becomes lower than the concentration of Xe at the inlet of the trap. When the concentration of Xe at the inlet of the trap exceeds 1 ppm, the concentration of Xe at the outlet of the trap exhibits an almost constant value which is not higher than about 0.9 ppm. This shows the fact that Xe is trapped to the liquid nitrogen refrigerated trap which is filled with glass wool.

In general, impurity gases which become a problem in KrF excimer laser have concentrations not lower than the order of ppm as shown FIG. 2A, FIG. 2B and FIG. 2C. It is obvious that impurity gases such as $SiF_4$, HF, etc. being lower in vapor pressure than Xe at the temperature of liquid nitrogen are trapped to the liquid nitrogen refrigerated trap more perfectly than Xe.

FIG. 5B shows a result of an adsorption experiment in which air mixed in He is adsorbed by using active carbon refrigerated to the temperature of liquid nitrogen. After the adsorption tower was filled with active carbon, the active carbon was refrigerated to the temperature of liquid nitrogen. The respective concentrations of $N_2$ and $O_2$ at the outlet of the adsorption tower were measured after air is mixed in He and is passed through the adsorption tower. The amount of added $N_2$ was about 4000 ppm and the amount of added $O_2$ was about 1000 ppm. For some time period after the starting of adsorption, the concentrations of $N_2$ and $O_2$ were both zero at the outlet of the adsorption tower. After 524 minutes, part of the $N_2$ was allowed to pass through the adsorption tower. The concentration of $N_2$ at the outlet of the adsorption tower incresed to about 5000 ppm. After the adsorption time period of about 1000 minutes, part of the $O_2$ was allowed to pass through the adsorption tower. The concentration of $O_2$ at the outlet of the adsorption tower gradually increased to approach about 1000 ppm. As the concentration of $O_2$ at the outlet of the adsorption tower increased, the concentration of $N_2$ at the outlet of the adsorption tower decreased to approach about 4000 ppm gradually.

That is, the above fact shows that both $N_2$ and $O_2$ are adsorbed into active carbon serving as an adsorbent refrigerated to the temperature of liquid nitrogen but the adsorption force of $N_2$ is weaker than that of $O_2$ so that $N_2$ having been already adsorbed is desorbed as $O_2$ is adsorbed.

The Lawrence Livermore National Laboratory in the United States has reported that He impurities produced by a nuclear fusion reaction are adsorbed when argon (Ar) gas is solidified in advance after a metal panel refrigerated to the temperature (about 5K) of liquid helium is disposed in a high vacuum pump. That is, it is considered that solidified argon gas serves as an adsorbent. When the low temperature trap is filled with a filler and then a gas which is solidified at a temperature of the refrigerated wall of the trap is attached and solidified in advance, the solidified gas serves as an adsorbent. When impurity gas components, which are nonsolidifiable at the temperature of the low temperature trap, are trapped to the refrigerated wall and solidified thereat, the solidified impurity gas components then serve as adsorbents in the same manner in a similar manner.

For example, in the case of a KrF excimer laser, the main components of impurities to be removed are $CF_4$, $SiF_4$ and HF. When a liquid nitrogen refrigerated trap is used to solidify Xe on the surface of the trap in advance, $SiF_4$ and HF lower in vapor pressure than Xe at the temperature of liquid nitrogen is solidified on the surface of the trap and, then, $CF_4$ higher in vapor pressure than Xe at the temperature of liquid nitrogen is adsorbed on the surface of the solidified Xe which serves as an adsorption surface. Accordingly, the KrF excimer laser gas medium can be efficiently purified using the liquid nitrogen refrigerated trap that contains the adsorbent which has been pretreated by solidifying $X_2$ at the trap temperature. Kr exhibiting a vapor pressure curve near that of $CF_4$ is also adsorbed on the surface of the liquid nitrogen refrigerated trap containing the solidified Xe, but the adsorption force of Kr is weaker than that of $CF_4$ because the vapor pressure of Kr is higher than that of $CF_4$. Accordingly, though Kr may be adsorbed at the initial stage, $CF_4$ being stronger in adsorption force than Kr is substituted for Kr at the position where Kr is adsorbed, by the interaction between Kr and $CF_4$ to thereby expel Kr from the adsorbent when $CF_4$ is adsorbed. Accordingly, the consumption of Kr in the liquid nitrogen refrigerated trap becomes no problem. The concentration of impurities in the laser gas medium of the KrF excimer laser is merely limited by the starting time of the $CF_4$ concentration at the outlet of the liquid nitrogen refrigerated trap.

Further, in the liquid nitrogen refrigerated trap using Xe as a solidified gas, adsorbed gases are Kr and $CF_4$, so that other impurities are solidified on the surface of the liquid nitrogen trap without influence on other components of the laser gas medium. The solidified impurity gases serve as adsorbents similarly to Xe. When the surface of the liquid nitrogen refrigerated trap adsorbing Kr and $CF_4$ is heated to an upper-limit temperature where Xe is not evaporated, the adsorbed Kr and $CF_4$ are desorbed so that a recycling treatment on the adsorption surface can be realized. Solidified impurities except Xe and $CF_4$ remain on the refrigerated wall and continuously serve as adsorbents.

Figure 1B:
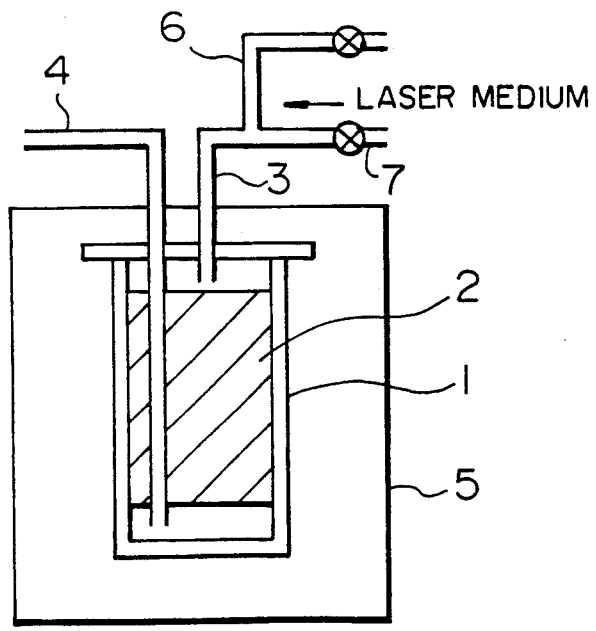

An embodiment of the present invention is shown in the FIGS. 1A and 1B. In the following, a method for purifying a laser gas medium of a KrF excimer laser as shown in FIG. 4 and a system used therefor are described.

In FIG. 1A, a liquid nitrogen refrigerated trap 1 is filled with a filler 2 such as glass wool, metal packing, metal Dixon rings, etc. The filler may be formed of a metal, such as stainless steel, copper, aluminum, etc., having high heat conductivity at a predetermined refrigeration temperature. The filler is provided so that the trap is not blocked by solidification of gases and that the area touching passing gases becomes large.

A gas inlet pipe 3 is connected to the upper portion of the liquid nitrogen refrigerated trap 1. A gas outlet pipe 4 is connected to the lower portion of the liquid nitrogen refrigerated trap 1. The liquid nitrogen refrigerated trap 1 thus filled with the filler 2 is immersed in a liquid nitrogen tank 5, so that the whole thereof is refrigerated to the temperature of liquid nitrogen. The gas inlet pipe 3 is connected to an Xe supply pipe 6 and to a gas medium supply pipe 7, so that gases can be selectively supplied by the operation of valves. The Xe supply pipe 6 is connected to an Xe source through a valve. The gas medium supply pipe 7 and the gas outlet pipe 4 are connected to a laser tube. Before the KrF laser is operated, liquid nitrogen is supplied in the liquid nitrogen tank 5 so that the liquid nitrogen refrigerated trap 1 is refrigerated to the temperature of liquid nitrogen and then Xe from the Xe source 8 is fed into the liquid nitrogen refrigerated trap 1 through the Xe supply pipe 6 and the gas inlet pipe 3. The Xe gas is solidified on the surface of the filler 2 refrigerated to the temperature of liquid nitrogen.

The gas solidified on the surface of the filler in advance as described above must be a gas having no influence on the gas purity of the laser gas medium. In this point of view, an inert gas is effective because it has no influence on the constructed system. For example, Xe gas is effective for KrF laser and Kr gas is effective for ArF laser. That is, any suitable gas can be used if the gas is lower in vapor pressure than the respective components of the laser gas medium and has no influence on laser oscillation performance.

Thereafter, as shown in FIG. 1B, the Xe source 8 is disconnected from the gas inlet pipe 3 by the valve, the gas medium supply pipe 7 connected to the laser tube is connected to the gas inlet pipe 3, so that the laser gas medium from the laser tube is injected into the liquid nitrogen refrigerated trap 1. Electric discharge is started in the laser tube and the laser gas medium is circulated through the liquid nitrogen refrigerated trap 1 while continuing the laser oscillation. The filler 2 in the liquid nitrogen refrigerated trap 1 forms a trap surface refrigerated to the temperature of liquid nitrogen and solidifies Xe so that it serves also as an adsorption surface. Accordingly, $SiF_4$ and HF exhibiting low vapor pressures at the temperature of liquid nitrogen are solidified on the trap surface and, at the same time, CF$_4$ exhibiting higher vapor pressure than that of Xe at the temperature of liquid nitrogen is adsorbed.

Here, impurities such as SiF$_4$, HF, etc. lower in vapor pressure than Xe are thoroughly solidified on the surface of the solidified gas, so that the solidified impurities serve as new adsorbents to adsorb impurities such as CF$_4$, etc. higher in vapor pressure than the solidified gas. This property can be generally applied to gases lower in vapor pressure than the solidified gas.

As described above, impurities in the laser gas medium are removed to purify the laser gas medium. Though Kr is also adsorbed on the surface of the filler 2, Kr is expelled from the adsorption surface to return to the laser gas medium as CF$_4$ is adsorbed. Because the laser gas medium passing through the liquid nitrogen refrigerated trap 1 is thus purified and returned to the laser tube, the long-term constant power operation of the KrF excimer laser is made possible. In the case where the capacity of adsorption for CF$_4$ is lowered, Kr and CF$_4$ higher in vapor pressure than Xe can be desorbed from the adsorption surface by disconnecting the liquid nitrogen refrigerated trap 1 from the laser tube and raising the temperature of the liquid nitrogen trap 1 to an upper-limit temperature where the solidified Xe is not evaporated. After the adsorption surface formed by the filler 2 is thus re-activated, the liquid nitrogen trap 1 is refrigerated again to the temperature of liquid nitrogen so that it can be used for purifying the laser gas medium.

If two liquid nitrogen traps of similar characteristics, as shown in of FIGS. 1A and 1B, are connected to a laser tube so that one trap is connected to the laser tube while the other trap is re-activated, the continuous operation time can be elongated.

Although the above description is made upon the case where a laser gas medium for KrF excimer laser or ArF excimer laser is purified, it is self-evident to those skilled in the art that the aforementioned method can be applied to purification of other gas media including inert gas. Although above description is made upon the case where Xe is used as a gas solidified on the refrigerated wall of the low temperature trap, the invention can be applied to the case where other solidifiable gases may be used. Impurity gases being strong in adsorption force and impurity gases being low in vapor pressure can be removed by filling a low temperature trap with a filler and solidifying a solidifiable gas on the surface of the filler to form an adsorption surface.

It will be obvious for those skilled in the art that various alterations, substitutions, modifications, combinations, and improvements are possible without departing from the spirit of the appended claims.

I claim:

1. A method for performing laser oscillation in a gas laser apparatus while circulating a laser gas medium containing a rare gas,
   preliminarily applying a solidifiable gas which is not a component of the laser gas medium and which solidifies at a trap temperature in a low temperature trap containing a filler, to solidify said solidifiable gas and thereby forming an adsorption surface; and
   then, contacting said laser gas medium with said low temperature trap.

2. The method according to claim 1, wherein said laser gas medium contains Kr and said solidifiable gas is Xe.

3. The method according to claim 2, wherein the laser gas medium comprises Ne, Kr and F$_2$.

4. The method according to claim 3, wherein the laser gas medium contains at least one gas impurity selected from the group consisting of N$_2$, O$_2$, CF$_4$, HF and SiF$_4$.

5. The method according to claim 4, wherein the laser gas medium circulates at a flow rate of 5Nl/minute and is at a guage gas pressure of 2 to 5 Kg/cm$^2$G.

6. The method according to claim 1, wherein said low temperature trap is cooled by liquid nitrogen.

7. A gas laser apparatus comprising:
   a laser tube for containing a laser gas medium and for emitting laser light;
   a low temperature trap containing a filler and being connected to said laser tube so as to form a circulation path;
   a refrigerant vessel for refrigerating said low temperature trap to a predetermined temperature; and
   means for supplying to said low temperature trap, a solidifiable gas which solidifies at said predetermined temperature.

8. The apparatus according to claim 7, wherein said laser tube contains Kr and said solidifiable gas is Xe.

9. The apparatus according to claim 7, wherein said low temperature trap is cooled by liquid nitrogen.

10. The gas laser apparatus according to claim 7, wherein said filler is at least one selected from the group consisting of glass wool, metal packing and metal rings.

11. The apparatus according to claim 7, wherein the gas laser is a KrF excimer laser.

12. The apparatus according to claim 11, wherein the filler contains a metal selected from the group consisting of stainless steel copper and aluminum.

13. The apparatus according to claim 7, wherein the gas laser is an ArF excimer laser.

* * * * *